(12) United States Patent
Li et al.

(10) Patent No.: US 8,621,037 B2
(45) Date of Patent: Dec. 31, 2013

(54) SYSTEM AND METHOD TO CREATE BI-DIRECTIONAL EVENT SUBSCRIPTIONS

(75) Inventors: Li Li, Bridgewater, NJ (US); Wu Chou, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 153 days.

(21) Appl. No.: 13/244,343

(22) Filed: Sep. 24, 2011

(65) Prior Publication Data

US 2012/0079066 A1 Mar. 29, 2012

Related U.S. Application Data

(60) Provisional application No. 61/387,106, filed on Sep. 28, 2010.

(51) Int. Cl.
*G06F 15/16* (2006.01)
(52) U.S. Cl.
USPC .......................................................... 709/217
(58) Field of Classification Search
USPC .......................................................... 709/217
See application file for complete search history.

(56) References Cited

U.S. PATENT DOCUMENTS 8,060,572 B2 * 11/2011 Brown et al. ................. 709/206
8,370,423 B2 * 2/2013 Ozzie et al. .................... 709/203

OTHER PUBLICATIONS

Fielding—Architectural Styles and the Design of Network-based Software Architectures, University of California, Irvine—2000, 180 pages.
Chandy—Event-Driven Applications: Costs, Benefits and Design Approaches—California Institute of Technology—2006, 40 pages.
Michelson—Event-Driven Architecture Overview—http://dx.doi.org/10.1571/bda2-2-06cc, 2006, 9 pages.
Event driven architecture onto the Azure Services Platform, http://www.microsoft.com/belux/architect/issue_3/azure_services_platform.aspx, 2009, 7 pages.
Baxter et al.—Google Wave Federation Protocol Over XMPP, http://wave-protocol.googlecode.com/hg/spec/federation/wavespec.html, Jul. 2009, 7 pages.
Gregorio—Google Wave Client-Server Protocol Whitepaper—May 2010, 28 pages.
Rowstron et al.—SCRIBE: The design of a large-scale event notification infrastructure—Nov. 2001, 13 pages.

* cited by examiner

*Primary Examiner* — Andrew Georgandellis
(74) *Attorney, Agent, or Firm* — Kacvinsky Daisak PLLC; John Maldjian, Esq.; Alexander D. Walter, Esq.

(57) ABSTRACT

System and method to create a bi-directional event subscription. The method includes responding to a request by providing a URI of the subscription factory of the first topic; receiving a request to create a bidirectional subscription; creating a first subscription resource to represent an outbound event flow from a first topic to a second topic; sending a discovery request to a remote host for a URI of a subscription factory of the second topic; receiving the URI of the subscription factory of the second topic; requesting creation of a second subscription resource, to represent an outbound event flow from the second topic to the first topic; receiving from the remote host a URI of the second subscription resource; entangling the first subscription resource with the second subscription to form the bi-directional event subscription; and providing to the web browser a URI of the first subscription.

20 Claims, 8 Drawing Sheets

SYSTEM AND METHOD TO CREATE BI-DIRECTIONAL EVENT SUBSCRIPTIONS

CROSS-REFERENCE TO RELATED APPLICATIONS

This application claims the benefit of U.S. Provisional Patent Application Ser. No. 61/387,106, filed on Sep. 28, 2010, the content of which is hereby incorporated by reference in its entirety.

BACKGROUND

1. Field of the Invention

Embodiments of the present invention generally relate to bidirectional subscriptions. More specifically, embodiments of the present invention relate to a system and method for creating and managing bidirectional subscriptions as one transaction using Representational State Transfer.

2. Description of the Related Art

Computer-implemented collaborative and communication application programs, sometimes referred to as groupware, may be used by collaborative workers located at separate workstations to, for example, collaboratively prepare and/or review a computer-based document such as a word processing file, a presentation, a graphic file, a PDF, etc. An early example of such groupware was Lotus Notes. Such application programs rely heavily upon communication among collaborative workers using the applications. Such application programs commonly use inter-workstation messages such as sending subscription requests and receiving event notifications.

As more and more collaborative and communication application programs incorporate usage of the World Wide Web ("Web") to communicatively connect collaborative workers, the ability to subscribe and receive event notifications in real-time on the Web is relatively more important. Several technologies have been developed to enable HTTP servers to push events to clients, including Bidirectional HTTP (e.g., Bayeux, BOSH and Server-Sent Events), and WebSockets. However, these technologies assume a client-server architecture and are not based on subscriptions. Without subscription, an event channel cannot be recovered after a server reboots.

RSS and Atom are two data formats that describe the published resources (i.e., feeds), including news, blogs and wikis, whose contents are updated by the content providers. The content providers syndicate the feeds on their web pages for the feed readers which fetch the updates by periodically polling the feeds. However, such polling is very inefficient in general, because the timing of the updates is unpredictable. Polling too frequently may waste a lot of network bandwidth, when there is no update. On the other hand, polling too infrequently may miss some important updates and incur delay on information processing.

To address the inefficiency of poll style feed delivery, a topic based subscription protocol called PubSubHubbub has been developed. In this protocol, a hub web server acts as a broker between feed publishers and subscribers. A feed publisher indicates in the feed document (Atom or RSS) its hub URL, to which a subscriber (a web server) can register the callback URL. Whenever there is an update, a feed publisher notifies its hub which then fetches the feed and multicasts (push) it to the registered subscribers. While this protocol enables more efficient push style feed updates, it does not describe how hubs can work cooperatively (i.e., be federated) to provide a global feed update service across different web sites. The protocol defines the unsubscribe operation by overloading POST which should have been DELETE—DELETE is idempotent and can be resubmitted but POST is not. Also the subscriptions are not modeled as addressable resources—if a subscription cannot be addressed, then it cannot be linked from other resources, which breaks the hypermedia constraint of REST.

Methods have been developed to provide asynchronous event delivery to web browsers, such as Ajax, Pushlet, Server-Sent Events and Web Sockets. However, these techniques are not applicable to federated notification services, where server to server relations and communication protocols are needed.

In software engineering, Publisher-Subscriber and/or Observer are software design patterns for keeping the states of cooperative components or systems synchronized by event propagation. They are widely used in event-driven programming for GUI applications. These design patterns have also been used for distributed computing, including Java Message Service (JMS), CORBA Event Service, CORBA Notification Service, which are not based on web services.

To further provide asynchronous event delivery, two event notification web services standards, Web Services Notification ("WS-Notification") and Web Services Eventing ("WS-Eventing") have been developed. However, these standards are not based on REST. Instead they are based on Web Services Description Language ("WSDL") and Simple Object Access Protocol ("SOAP"), which are messaging protocols that are alternatives to REST.

WS-Topic is an industrial standard to define a topic-based formalism for organizing events. WS-Topic provides defines a mechanism to organize and categorize items of interest for subscription known as "topics" that are used in conjunction with the notification mechanisms defined in WS-Base Notification. However, these topics are not REST resources but are XML elements in some documents.

Event-Driven Architecture (EDA), with Service-Oriented Architecture (SOA), is used to enable agile and responsive business processes within enterprises. The fundamental ingredients of EDA are the following actors: event publishers that generate events, event listeners that receive events, event processors that analyze events and event reactors that respond to events. The responses may cause more events to occur, such that these actors form a closed loop.

The system model of the notification services is based on an overlay network of event brokers, including those based on DHT. There are two types of brokers: the inner brokers that route messages and the border brokers that interact with the event producers and listeners. A border broker provides an interface for clients to subscribe, unsubscribe, advertise and publish events. An event listener is responsible to implement a notify interface in order to receive notifications. However, no known notification systems are based on RESTful web services.

XMPP (RFC3920) supports efficient bidirectional XML streams between XMPP servers using two TCP/IP connections. This creates bidirectional notification flows between XMPP servers. However, XMPP protocol is not based on REST web services. Although BOSH (XEP-0124) uses HTTP long-polling to emulate bidirectional TCP streams, the established streams are not web resources that can be manipulated by HTTP. XMPP also supports a publish/subscribe extension (XEP-0060) to allow XMPP entities to subscribe and publish events to topics. But these subscriptions are unidirectional and not web resources.

Bayeux is a protocol that supports both HTTP long-polling and streaming mechanisms to allow a HTTP server to push notifications to a HTTP client. Although this protocol can be combined with normal HTTP request/response to support bidirectional notification flows, this combination only applies to client-server and cannot create bidirectional subscriptions.

Server-Sent Events defines a protocol that uses HTTP streaming to allow a HTTP server to push notifications to a HTTP client. Although this protocol can be combined with normal HTTP request/response to support bidirectional notification flows, this combination only applies to client-server and cannot create bidirectional subscriptions.

Google Wave provides near real-time state synchronization between web browsers that are in the same Wave session. Since Google Wave Federation Protocol is based on XMPP, it does not use HTTP to create or manage event subscriptions at all. Google Wave Client-Server Protocol is based on WebSockets and JSON. The protocol supports bidirectional notifications over a single TCP connection without subscriptions.

Microsoft Azure cloud platform has several built-in mechanisms to support EDA (Event-Driven Architecture), including server-to-server event subscriptions, for example between an event queue and a router. Azure support only the conventional unidirectional subscriptions.

To support subscription-based notification delivery between web servers, web-based event subscription protocols (e.g. WS-Notification, WS-Eventing, Google Subpubhubbub, etc.) have been developed to establish event channels between the web servers.

WS-Notification and WS-Eventing are two SOAP based web service standards that support server-to-server event subscription and delivery. Although these protocols can be transported over HTTP, they do not follow the constraints of REST. For instance, these protocols are not based on connected resources that support uniform interface. Furthermore, the subscriptions created by these protocols are unidirectional.

Google Pubsubhubbub (version 0.4) is an HTTP based protocol that supports server-to-server subscriptions as REST web services. It allows a subscriber (a web server) to subscribe to a hub (a web server) to receive updates on some topic. However, the subscriptions are unidirectional.

In these web-based event subscription protocols, a subscription represents an agreement between an event publisher and an event listener by which the event publisher agrees to send notifications, subject to a specified filter, to the event listener for an agreed time period, which may be indefinite. These web-based event subscription protocols only create unidirectional subscriptions such that notifications flow in one direction, i.e., from an event publisher to an event listener, hosted by a respective web server. Because notifications between web servers (or peers) may flow in both directions, two separate event channels, one to send and one to receive, are more efficient for asynchronous notification delivery.

When these two event channels are coordinated and have the same agreed time period, it is not efficient to use two unidirectional subscription transactions to manage them at least for the following reasons:

First, it is more difficult to coordinate two subscriptions with two transactions than with one, especially when the transactions involve multiple user credentials and servers;

Second, two subscription transactions have more network latency than one transaction.

Thus, there is a need for a system and method to create and manage bidirectional subscriptions as one transaction.

SUMMARY

As the Web is becoming a communication and collaboration platform, there is an acute need for an infrastructure to disseminate real-time events over the Web. An architectural style that underlies the Web is REpresentational State Transfer ("REST"). A web service that is compatible with REST is said to be "RESTful." However, such infrastructure is still seriously lacking certain capabilities, because conventional distributed event-based systems are not designed for the Web. To address this issue, we develop a RESTful web service framework, "R-Event." It represents and encapsulates the structural elements of Event-Driven Architecture ("EDA") into the infrastructure of REST.

Embodiments of the present invention lead to an event-driven web having four layers of RESTful web services. The R-Event framework implements the layers that are important to the event-driven web. A core component of this framework is federated topic hubs that provide services for notification publication, subscription, delivery, tracking, and linking. The advantages and applications of this approach are presented and discussed, including the important features of addressability, connectedness, dynamic topology, robustness, scalability, and efficient notifications. A prototype system for presence driven collaboration is developed and the preliminary performance tests show that the proposed approach is feasible and advantageous.

Embodiments of the present invention generally relate to bidirectional subscriptions. More specifically, embodiments of the present invention relate to a system and method for creating and managing bidirectional subscriptions as one transaction using Representational State Transfer.

In one embodiment of the present invention, there is provided a method to create a bi-directional event subscription, comprising: receiving a discovery request from a web browser for a URI of a subscription factory of a first topic; providing a URI of the subscription factory of the first topic; receiving a request from the web browser to create a bidirectional subscription; creating a first subscription resource to represent an outbound event flow from a first topic to a second topic; sending a discovery request to a remote host for a URI of a subscription factory of the second topic; receiving from the remote host the URI of the subscription factory of the second topic; requesting that the remote host create a second subscription resource, to represent an outbound event flow from the second topic to the first topic, wherein the second subscription resource is entangled with the first subscription resource; receiving from the remote host a URI of the second subscription resource; entangling the first subscription resource with the second subscription to form the bi-directional event subscription; and providing to the web browser a URI of the first subscription.

In one embodiment of the present invention, there is provided a system to create bi-directional event subscriptions, comprising: a first receiver configured to receive a discovery request from a web browser for a URI of a subscription factory of a first topic, and to receive a request from the web browser to create a bidirectional subscription; a first transmitter configured to provide a URI of the subscription factory of the first topic; a creation module configured to create a first subscription resource to represent an outbound event flow from a first topic to a second topic; a second transmitter configured to send a discovery request to a remote host for a URI of a subscription factory of the second topic, and to send a request to the remote host that the remote host create a second subscription resource, to represent an outbound event flow from the second topic to the first topic, wherein the second subscription resource is entangled with the first subscription resource; a second receiver configured to receive from the remote host the URI of the subscription factory of the second topic, and to receive from the remote host a URI of the second subscription resource; an entanglement module configured to entangle the first subscription resource with the second subscription to form the bi-directional event subscription, wherein the first transmitter is further configured to provide to the web browser a URI of the first subscription.

BRIEF DESCRIPTION OF THE DRAWING

So the manner in which the above recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments encompassed within the scope of the present invention, and, therefore, are not to be considered limiting, for the present invention may admit to other equally effective embodiments, wherein.

Figure 1:
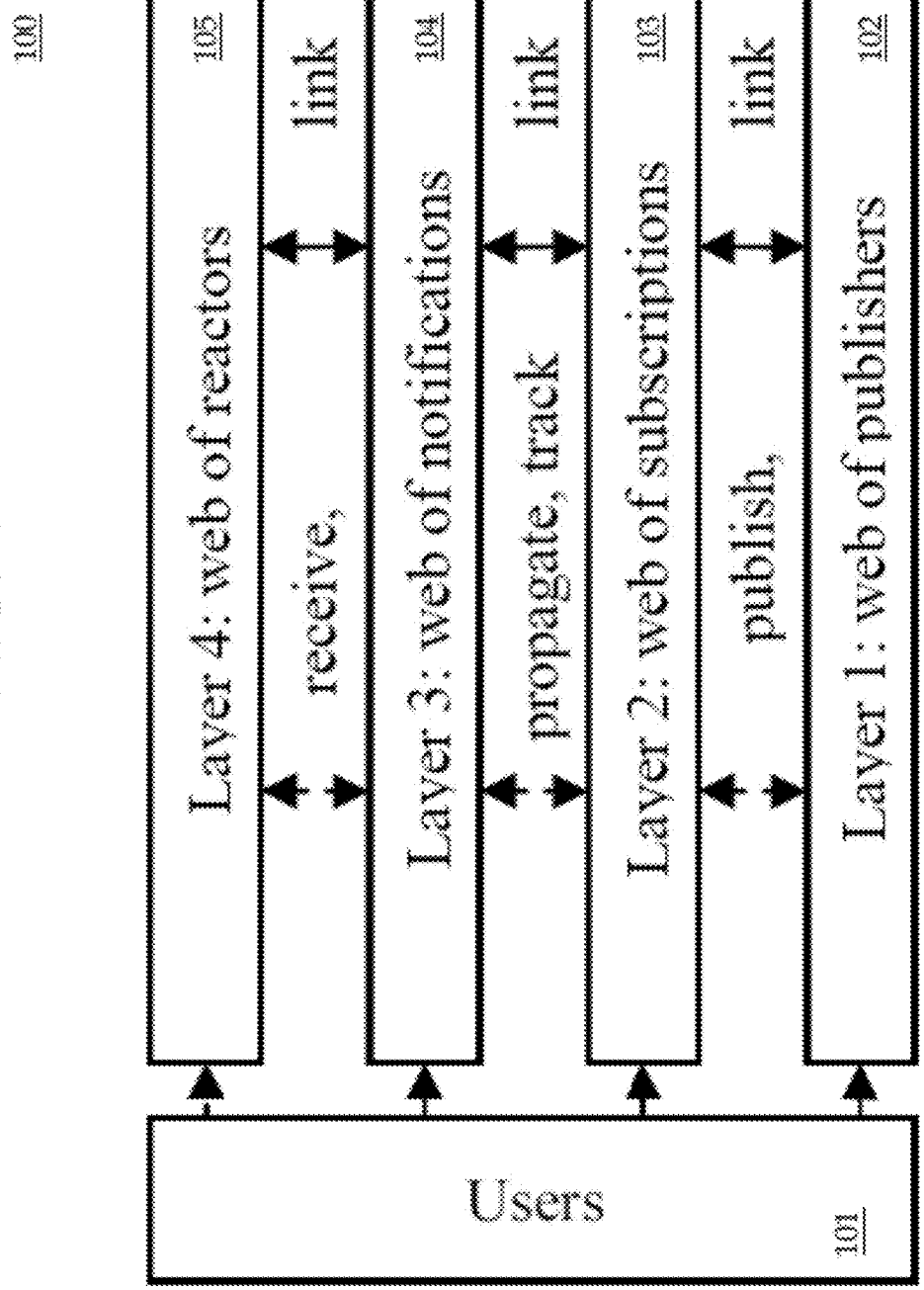
FIG. 1 presents a model of an event-driven web in accordance with an embodiment of the present invention.

The headings used herein are for organizational purposes only and are not meant to be used to limit the scope of the description or the claims. As used throughout this application, the word may is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines.

DETAILED DESCRIPTION

Embodiments of the present invention generally relate to bidirectional web subscriptions. More specifically, embodiments of the present invention relate to a system and method for creating and managing bidirectional subscriptions as one transaction based upon Representational State Transfer.

As used herein in connection with embodiments of the present invention, the term "REST" refers to REpresentational State Transfer web services, as described below in further detail.

As used herein in connection with embodiments of the present invention, the term "RESTful" refers to a web service that is compatible with REST.

As used herein in connection with embodiments of the present invention, the term "R-Event" refers to a RESTful web service framework, and in particular to a RESTful web service framework which is usable to implement distributed event-based systems.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

Web Initiation Protocol ("WIP") is a web-service based protocol and architecture that uses WS-Eventing to negotiate media transports for IP based multimedia communication. WIP treats media streams as bidirectional events, and some extensions to WS-Eventing are used to negotiate the media transport parameters.

As used herein in connection with embodiments of the present invention, the term "resource" refers to a special component that is addressable by URI and supports a uniform interface as defined by REST. Any information that can be named can be a resource: a document or image, a temporal service (e.g. "today's weather in Los Angeles"), a collection of other resources, a non-virtual object (e.g. a person), and so on. In other words, any concept that might be the target of an author's hypertext reference fits within the definition of a resource. A resource is a conceptual mapping to a set of entities, not the entity that corresponds to the mapping at any particular point in time.

Embodiments of the present invention provide a method to create and manage bidirectional subscriptions as one transaction based on REpresentational State Transfer ("REST") web services, as described below in further detail. A method in accordance with an embodiment of the invention may be provided to realize a bidirectional subscription as web resources, and to realize an HTTP based protocol to support the creation and management of such bidirectional subscriptions. Embodiments of the present invention improve upon the art at least by: being implemented as a server-to-server protocol while being applicable to client-server architectures; being based on REST web services as described below in greater detail; and supporting bidirectional subscriptions.

REST provides resource management and promotes architectural choices that include:

1) Addressability—each resource can be addressed by Uniform Resource Identifier ("URI");

2) Connectedness—resources are linked to provide navigations;

3) Uniform Interface—all resources support a subset of a uniform interface between components, namely GET, PUT, DELETE and POST. GET is safe and idempotent (i.e., can be resubmitted if failed without corrupting resource states). PUT and DELETE are not safe but are idempotent.

4) Statelessness—all requests to a resource contain all of information necessary to process the requests, and the servers do not need to keep any context about the requests. Stateless servers are robust and easy to scale. Statelessness induces the properties of visibility, reliability, and scalability. Visibility is improved because a monitoring system does not have to look beyond a single request datum in order to determine the full nature of the request. Reliability is improved because it eases the task of recovering from partial failures. Scalability is improved because not having to store state between requests allows the server component to quickly free resources, and further simplifies implementation because the server does not have to manage resource usage across requests.

5) Layering: intermediate proxies between clients and servers can be used to cache data for efficiency. The layered system style allows an architecture to be composed of hierarchical layers by constraining component behavior such that each component cannot "see" beyond the immediate layer with which they are interacting. By restricting knowledge of the system to a single layer, layering places a bound on the overall system complexity and promote substrate independence. Layers can be used to encapsulate legacy services and to protect new services from legacy clients, simplifying components by moving infrequently used functionality to a shared intermediary. Intermediaries can also be used to improve system scalability by enabling load balancing of services across multiple networks and processors.

Although WIP supports a form of bidirectional subscription, there are some significant differences compared to embodiments in accordance with the present invention. First, WIP is based on a different protocol stack includes HTTP, SOAP, WS-Addressing, WS-Eventing and XML. Second, WIP assumes a WSDL based web service architecture that is different from REST web service architecture. For instance: 1) WIP does not have the concept of resource with uniform interface; 2) WIP is not driven by hypertext; 3) WIP does not use cache. Third, WIP is aimed to establish media transports (RTP) between two endpoints. In contrast to WIP, embodiments in accordance with the present invention are based on resources with uniform interface, are driven by hypertext and use cache. Furthermore, embodiments in accordance with the present invention cover bidirectional event streams in any media type, including RTP as a special case. Embodiments in accordance with the present invention are based on a simpler and more Web friendly stack of HTTP, URI and XML R-Event as a RESTful Web Service Architecture We now move on to describing a web service "R-Event" that is compatible with REST, and is usable to implement bi-directional event-based systems.

The Web has undergone a rapid evolution from an informational space of static documents to a space of dynamic communication and collaboration. However, to some large extent, the Web is still a reactive informational space and information sharing is still mostly pull based. Consequently, there could be significant latency between the availability of a piece of information and the use of that information. This model of information sharing has worked well for the Web, but is becoming increasingly insufficient for new emerging applications.

In the early days of the Web, changes to web content were infrequent and a user could rely on web portals, private bookmarks, or search engines to find information. However, in the era of Web 2.0, dynamic and user-generated content have become increasingly popular, such as blogs, wikis, mashups, folksonomies, social networks, etc. People are demanding timely and almost instant availability of these dynamic contents, and interactive use of this information, without being overwhelmed by information overload. This drives the Web from an informational space towards a communication and collaboration oriented environment that affects both consumer and enterprise application spaces. These new trends demand an event-driven web in which information sharing is driven by events to support the dynamic and near real-time information exchange.

Despite many existing event notification systems developed over the years, infrastructures and technologies for such an event-driven web are still seriously lacking. As the architectures, protocols, and programming languages of the existing event notification systems are developed outside of the web, there is an acute need for a unifying framework that can provide a seamless integration of these notification systems with the infrastructure of web and web based services.

For such a unifying framework, a foundation is built on an Event-Driven Architecture (EDA), in which information is modeled as asynchronous events that are pushed to the interested parties as they occur. By synchronizing the states of the communicating parties through events, EDA makes real-time communication and collaboration possible. Moreover, EDA is a natural fit for the Web as both do not assume any centralized control logic. However, the current web protocols are based on client-server architecture which does not readily support EDA. Even though some recent standards and industrial efforts, such as Atom, Server-Sent Events, Web Sockets and HTML 5, introduce the notion of feed and event, they are aimed at the web browsers and human users. Combining EDA and REST to enable and support federated event-driven web services is a relatively unresearched area of study.

Because EDA is an abstract architecture, whereas REST is based upon a concrete protocol (HTTP), we examined how to project the elements of EDA to those entities of REST in a consistent framework. In our approach in accordance with embodiments of the present invention, we found that many important features and problems in conventional event notification systems can be established and resolved efficiently in the REST based framework. For instance, the uniform interface, connectedness, and addressability of REST can apply and facilitate the discovery of notification web services. The idempotent operations and statelessness of REST can add robustness and scalability to notification web services. Furthermore, projecting EDA to REST can facilitate transformation of conventional notification systems into "RESTful" web services (i.e., web services that are compatible with REST), because EDA can be viewed as a generalization of the architectural elements in those notification systems.

In an approach in accordance with embodiments of the present invention, the concepts of EDA are projected into four layers of an event-driven web. Each layer includes interconnected resources that collectively provide RESTful web services for applications. This projection leads to a RESTful web service architecture, "R-Event," that provides the notification web services for such an event-driven web. To maximize the reuse and interoperability, these layers are weaved and combined through RESTful web services composition and linking. A prototype event-driven web includes topic hubs and topic webs, and is implemented to demonstrate the feasibility and advantages of this approach.

Event-Driven Web

To project EDA to REST, we model the EDA concepts notification, subscription, publisher, and reactor (i.e., an entity that reacts to an event) as interconnected resources that support the uniform interface of REST. As the result, an event notification system becomes an event-driven web: a web of resources that responds to events as envisioned by EDA. There is no longer any boundary between different event notification systems as the event-driven webs are interconnected into the Web and interoperable under REST. Because an event-driven web is built on layered resources, FIG. 1 presents a model 100 of the event-driven web divided into four layers.

Users 101 may interact with each of the four layers. Layer 1, reference item 102, is a web of event publishers. They could be any resource that generates, advertises and publishes its events.

Layer 2, reference item 103, is a web of subscription resources that depends on Layer 1, reference item 102. Subscription resources define how notifications flow from the publishers to the reactors. They provide services for subscribers to manage the subscription links, such as change the filter, as well as to deliver and track the notifications.

Layer 3, reference item 104, is a web of notifications that depends on Layer 2, reference item 103. Notifications are treated both as resources and messages. This approach allows us to link notifications with relevant subscriptions and topics to facilitate information sharing and discovery. It also allows us to link notifications according to message exchange patterns and participants to capture the social interactions in communications and collaborations.

Layer 4, reference item 105, is a web of reactors that depends on Layer 3, reference item 104. The resources in this layer receive, process and react to the notifications. A reactor can be both an event listener and publisher.

The resources in layers 1 through 4 are interconnected, such that a user 101 can enter an event-driven web from any layer and navigate to other layers. Because layers 2 and 3 (reference items 103 and 104) constitute services shared by publishers and reactors, they are important to the event-driven web. Embodiments of the present invention provide "R-Event," a RESTful web service architecture to implement layers 2 and 3.

R-Event Framework

Figure 2:
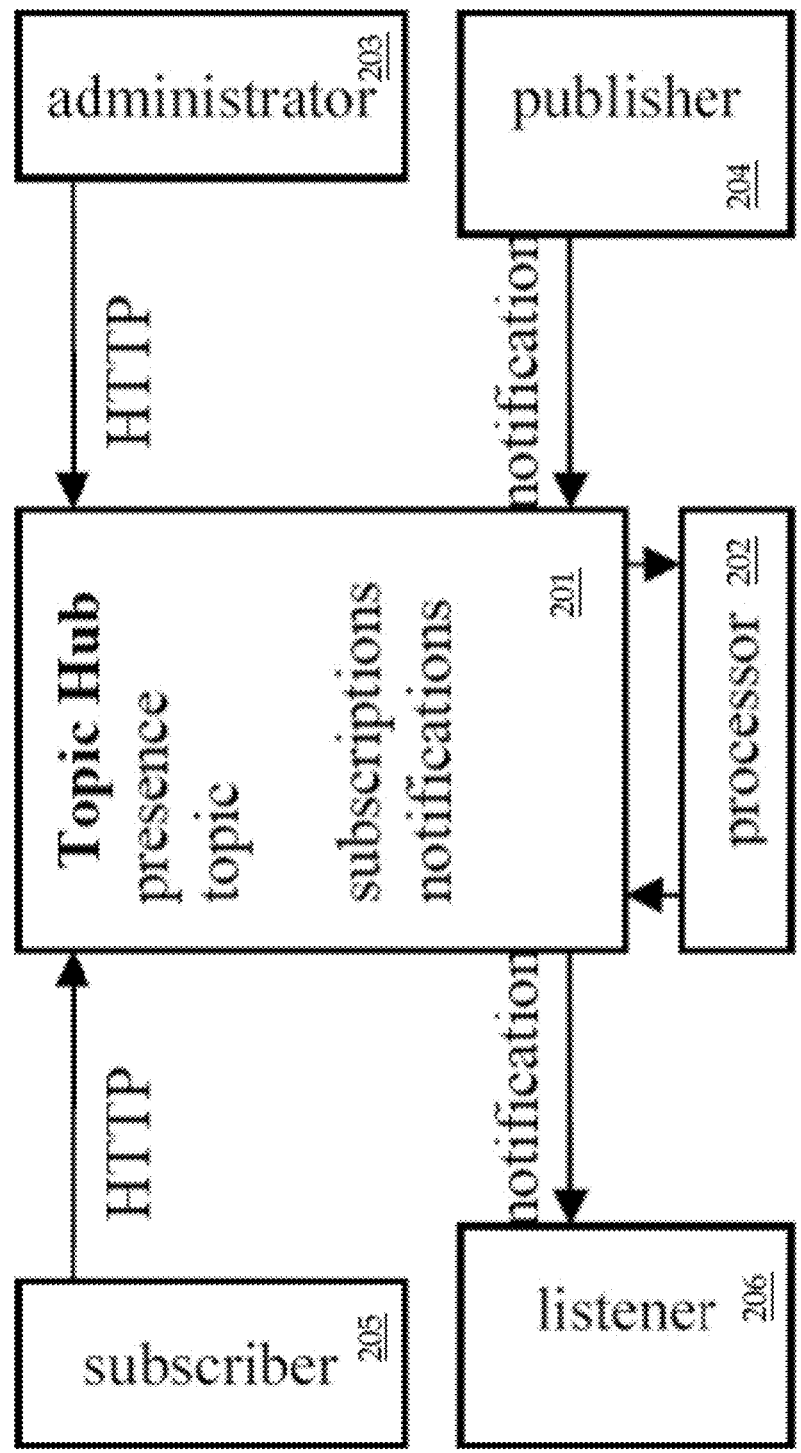
FIG. 2 is a diagram of high level interactions between a topic hub and its clients in accordance with an embodiment of the present invention.

A basic component of the R-Event framework is a topic hub that provides RESTful web services for notification publication, subscription, delivery, tracking and linking. The high level interactions between a topic hub 201 and its clients 205, 206 and servers 203, 204 are illustrated in FIG. 2. Topic hub 201 hosts three types of resources: topic, subscription and notification. Substantially each topic hub 201 also hosts a presence resource through which an administrator 203 can start or shut down the services. Topic hub 201 can be owned and operated by a single user or shared by a group of users. Topic hub 201 can also invoke distributed event processors 202 to process notifications.

Topic hub 201 is light-weight (i.e., it is not computationally intensive) and topic hub 201 can be run on substantially any computing device, including mobile phones that support HTTP protocol. It can be a servlet on a HTTP server, a standalone HTTP server, or embedded in another application. The interactions between the topic hub 201 and its clients 205, 206 and servers 203, 204 are all based on RESTful web services.

Topic hub 201 can also be used as a gateway that translates conventional event infrastructures into REST web services. This approach can significantly reduce the cost of web service development while ensuring the quality of services.

Because topic hub 201 is based on REST design, it is stateless. Consequently, topic hub 201 can shut down and restart safely without losing any of its services, provided that the resource states are persisted. This is especially useful when the hubs are hosted on mobile devices, which can be turned on and off. Because a topic hub is stateless, it is also scalable. We can add more topic hubs to support more clients without worrying about client session replica or affinity.

Figure 3:
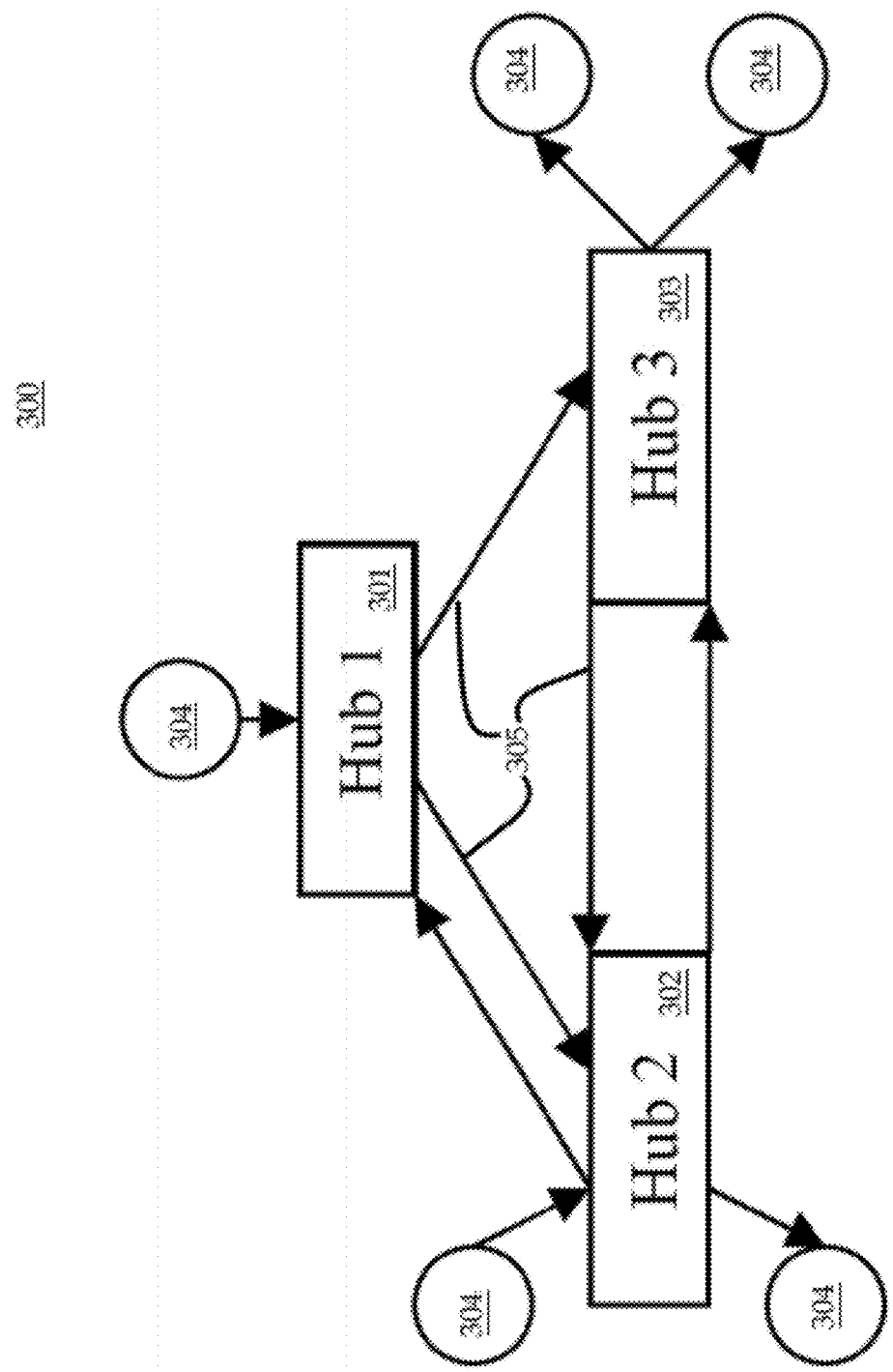
FIG. 3 is an example topic web in accordance with an embodiment of the present invention.

Topic hubs 201 can be interconnected by subscriptions to provide routing services to notifications. A group of interconnected topic hubs 201 forms a topic web. An example topic web 300 is illustrated in FIG. 3, where topic hubs 301, 302 and 303 are represented as rectangles and publishers/listeners 304 are represented by circles. Arrows 305 indicate the subscription links on which notifications flow. For sake of drawing clarity, not all arrows are marked with reference numbers.

The elements in an R-Event framework are described below in more formal notation. In these descriptions, the left-side symbol of an equation represents a resource and the right-side tuple represents the key properties of the resource defined by this framework. Embodiments in accord with the present invention can add more properties to these resources as needed.

A. Topic Tree

A topic tree is a set of topics organized as a tree. A topic is a resource to which events can be published and subscribed. More formally, a topic t has a set of events E, a set of children topics C:

$$t=(E,C), C=\{t_j | t_j \text{ is a child topic of } t\}.$$

B. Subscription

Conceptually, a subscription is a directed link from a publisher (p) to a listener (l). We extend the subscription to have a set of alternative listeners (L), filter (f), expiration (d), and status (u), such as active or paused. More formally, we have:

$$s=(p,L,a,f,d,u), L=\{l | l \text{ is a listener}\}$$

A notification n can propagate to one of the listeners in L if and only if the filter is evaluated to true, i.e., f(n)=true. A filter expresses the conditions under which event notifications should be sent (or blocked). Examples of filters may include specifying a content that should be propagated (e.g., if certain keywords are present), or may include whether certain the notification satisfies certain attributes (e.g., originates from a certain person or location). Another example of a filter may include "if someone's location has moved at least 5 miles" or "the inventory level drops below 5%." Which listener is selected is determined by an algorithm a, defined by the subscriber. A simple algorithm is to try listeners according to the order they are created until one succeeds.

Subscriptions can be used to link two topics by treating them as either publisher or listener. A subscription link from a publishing topic to a listening topic is represented by two subscription resources, each as a subordinate resource of the involved topics. On the publishing topic, it is called outbound subscription (os), as notifications flow out of it. On the listening topic, it is called inbound subscription (is), as notifications flow into it. The two matching subscriptions are double linked to keep their correspondence. More formally, we have:

$$os=(L,a,f,d,u), L=\{l | l=(t_j, is, g(is))\}, a(L)=l$$

$$is=(l,g(l)), l \in L$$

Here each listener resource l includes: 1) listening topic $t_j$; 2) inbound subscription is, and 3) the presence of is: g(is). An inbound subscription includes: 1) the listener l; and 2) the presence of l: g(l).

C. Topic Web

Given a set of topic hubs $H=\{h_i\}$ where each hub hosts a set of topic trees $T(h_i)=\{t | t \text{ is a topic on } h_i\}$, these topic trees form a web of topics linked by subscriptions. More formally, a topic web W(H) on top of a set of hubs H is defined as:

$$W(H) = \bigcup_{h_i \in H} T(h_i)$$

D. Notification

A notification is also modeled as an addressable resource that can be updated. More formally, we have:

$$n_i=(o,r,b,R),$$

$$r=\{(t,m) | t \text{ is a topic, } m \text{ is timestamp}\},$$

$$R=\{n_j | n_j \text{ is a response to } n_i\}$$

where:

origin (o): the URI of the original notification as it was posted. Any propagated copy of the original notification inherits this property to track its origin.

route (r): the ordered set of topics (t) and timestamp (m) visited by this notification during delivery. This is used to detect loop and to expose topics to listeners.

about (b): the URI of the notification that this message responds to.

Responses (R): the set of notifications responded to this notification

The topic web may contain cycles of subscriptions. To facilitate loop detection, each notification message has a special property route, which contains a list of topics visited by the notification during propagation. Each hub checks if the current topic is in the list. If so, a loop is found and the notification will not be propagated. Otherwise, the hub appends the topic to the list and propagates the notification.

E. Resource Design and Hub Protocols

Figure 4:
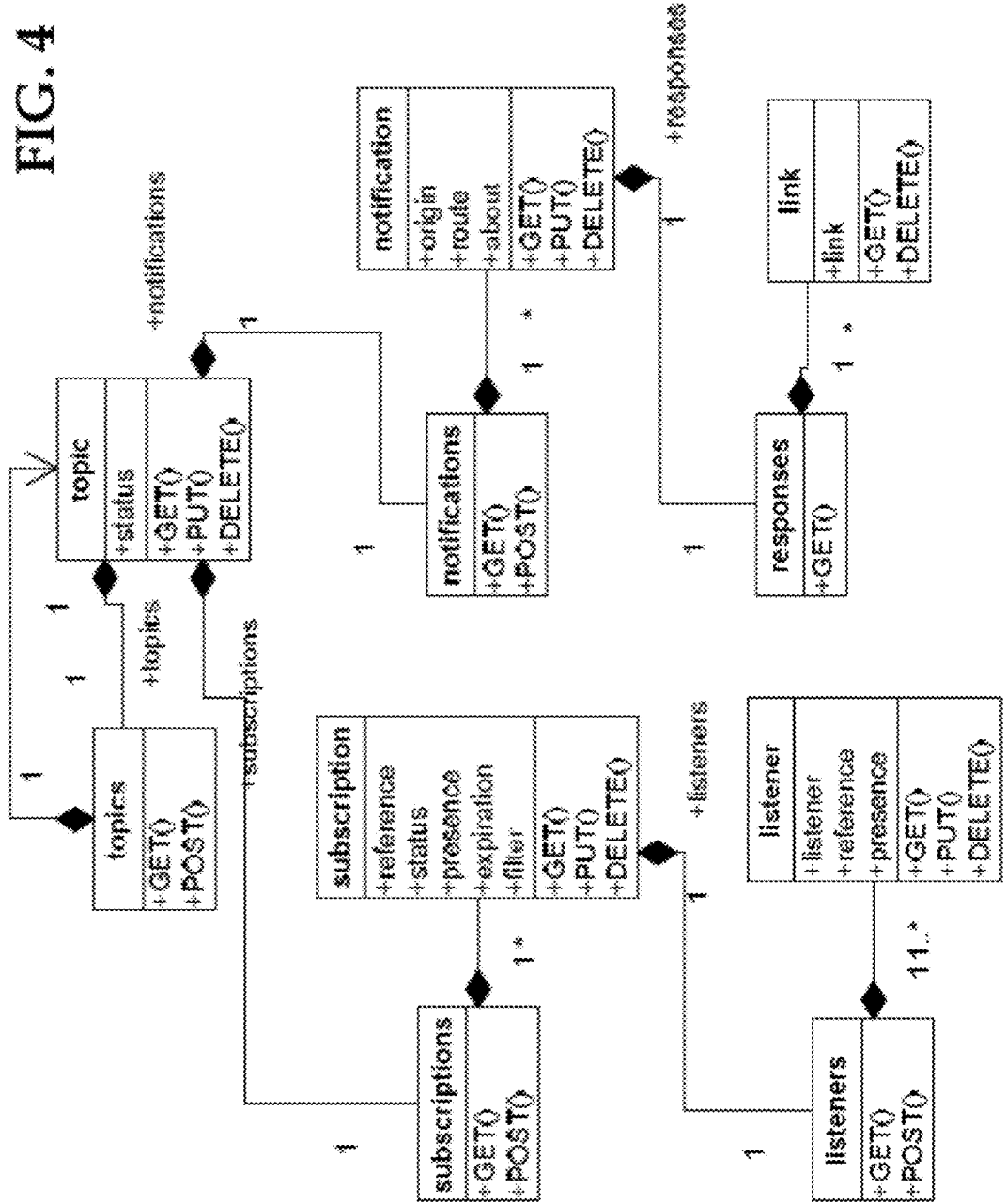
FIG. 4 is a UML class diagram that illustrates properties, interfaces and relations of resources, in accordance with an embodiment of the present invention.

FIG. 4 is a UML class diagram that illustrates properties, interfaces and relations of the resources. To facilitate client access, each resource on a hub is addressed by a predefined URI template that reflects the subordinate relations defined above:

Topic t: /topics/{t};
Child topic $t_j$ of topic t: topics/{t}/topics/{$t_j$};
Subscription s of topic t: /topics/{t}/subscriptions/{s};
Listener l: /topics/{t}/subscriptions/{s}/listeners/{l};
Notification with UUID {n} on topic t: /topics/{t}/notifications/{n}.

A subscription link from topic ta on hub A to topic tb on hub B may be established by a user using a web browser as follows:

1. The user requests a subscription resource under ta with POST;
2. Before returning to the user, hub A creates the outbound subscription under ta and requests the corresponding inbound subscription under tb with PUT (nested inside the POST);
3. Both requests succeed and the response is returned to the user;

A notification may be propagated between hubs by a user as follows:

1. The user posts a notification to a topic on hub A using POST that returns when the resource is created;
2. The notification is delivered by a scheduler to all listening topics with PUT that maintains the original UUID assigned to the notification by hub A; as the result, all the propagated notifications on different hubs can be identified by the same UUID;

Various embodiments of the present invention will provide the representations of its resources. Different representations (e.g., media types) of the same resource are supported through HTTP content negotiation. The communications between web browsers and the topic hubs may use methods described by W3C standards.

F. Security

The communication between the topic hubs are secured using HTTPS with PKI certificates based mutual authentication. Substantially each topic hub maintains a X.509 certificate issued by a Certificate Authority ("CA") that is trusted by other hubs. It is possible to obtain two certificates for each topic hub: one for its client role and one for its server role, such that these two roles can be managed separately.

The communications between the topic hubs and web browsers (users) are also secured by HTTPS. In this case, the browser authenticates the topic hub certificate against its trusted CA. In return, the users authenticate themselves to the hub using registered credentials (login/password or certificate). Once a user is authenticated to a topic hub A, it employs role-based authorization model to authorize a user for his actions.

If the user wants to create a subscription link from hub A to hub B, B has to authorize A for the inbound subscription. To satisfy this condition, the user first obtains an authenticated authorization token from hub B. The user then sends this token with the subscription message to hub A. Hub A uses this token to authorize itself to hub B for the inbound subscription creation. Once hub B creates the resource, it returns an access token to hub A to authorize it for future notifications to that topic.

An alternative to the above procedure is to use an OAuth 1.0 Protocol that allows a user to authorize a third-party access to his resources on a server. In this case, hub A becomes the third-party that needs to access the topic resources on hub B owned by the user. A procedure at a high level of abstraction in accordance with the OAuth 1.0 Protocol includes: 1) the user visits hub A to create a subscription to hub B; 2) hub A obtains a request token from hub B and redirects the user to hub B to authorize it; 3) the user provides his credentials to hub B to authorize the request token and hub B redirects the user back to hub A; 4) hub A uses the authorized request token to obtain an access token from hub B and creates the inbound subscription on B.

In both procedures described above, the user does not have to share his credentials on hub B with hub A.

Advantages of Event-Driven Web

On surface, the event-driven web built on top of the REvent framework, as described in the previous section, appears similar to the broker overlay network in the conventional notification architecture. However, it has the following advantages due to a REST-based design.

A. Addressability and Connectedness

Unlike conventional broker overlay networks that are a closed system whose usability is prescribed by the API, all resources in a topic web are addressable and connected. Unlike in a conventional broker overlay network that distinguishes between inner, border, or special rendezvous brokers, a topic web includes homogeneous topic hubs with the same type of web services. Users can navigate and search the topic web to find the interested information using regular web browsers or crawlers. The addressability and connectedness increase the "surface area" of the web services such that the information and services in a topic web can be integrated in many useful ways beyond what is anticipated by the original design.

B. Dynamic and Flexible Topology

Unlike a conventional broker network where brokers have fixed routing tables, a topic web can be dynamically assembled and disassembled by users for different needs. Its topology can be changed on the fly as subscriptions are created and deleted and hubs join and leave the topic web. For example, a workflow system can be created where work items are propagated as notifications between users. In an emergency situation, a group of people can create an ad-hoc notification network to share alerts and keep informed. In an enterprise, a topic web about a product can be created on demand such that alerts from field technicians can propagate to proper sales and supporting engineers in charge of the product to better serve the customers. In any case, once the task is finished, the topic web can be disassembled or removed completely. In this sense, a topic web is similar to an ad-hoc peer-to-peer network. However, a topic web is based on REST web services whereas each type of P2P network depends on its own protocols.

In conventional notification services, a broker routes all messages using one routing table. Therefore, it cannot participate in more than one routing topology. In our framework, a hub can host many topics, each having its own routing table (subscription links). As a result, a hub can simultaneously participate in many different routing networks. This gives the users the ability to simultaneously engage in different collaboration tasks using the same topic web.

C. Robustness and Scalability

Occasionally, servers may experience shutdown or failover due to causes such as, but not limited to, a hardware failure, a software failure, a hack attack, an extended loss of power, etc. In the event of shutdown or failover, topic hubs are robust because its resource states can be persisted and restored to support temporary server shutdown or failover.

The safe and idempotent operations, as defined by HTTP 1.1, also contribute to the robustness. The R-EVENT framework uses nested HTTP operations where one operation calls other operations. R-Event ensures that such a chain of operations is safe and idempotent by limiting how operations can be nested inside each other as follows:

nested(GET)={GET}
nested(POST)={GET,POST,PUT,DELETE}
nested(PUT)={GET,PUT,DELETE}
nested(DELETE)={GET,PUT,DELETE}

The robustness and scalability also come from the statelessness of REST design. The statelessness means that a topic hub can process any request in isolation without any previous context. By removing the need for such context, R-Event eliminates many potential failure conditions. In case R-Event needs to handle more client requests, R-Event can simply add more servers and have the load balancer distribute the requests at random to the servers who share the resources. If the resource access becomes a bottleneck, R-Event can consider duplication or partition of resources. This robustness and scalability is crucial when a topic hub serves as the gateway to large-scale notification systems.

D. Efficient Notifications

In conventional notification systems, notification is a message that can only be transmitted and stored. In the R-Event framework, notifications are also modeled as REST resources that provide services. Such model addresses the following issues in notification services:

Inline update: Because notifications are treated as addressable resources, a publisher can update a posted notification (using PUT) without having to create a new one. The updates will propagate over the subscription links in the topic web. This kind of inline update is more difficult to achieve in conventional notification services that treat notifications as messages.

Duplicate notification: In the topic web, a topic may receive different copies of a notification from multiple routes or multiple inline updates of the same notification, leading to potential duplicated notifications. Because a framework in accordance with embodiments of the invention uses PUT to deliver notifications, the duplicate notifications to a hub become multiple updates to a resource. Therefore, we can use HTTP ETag and If-None-Match headers to efficiently detect duplicate notifications and avoid spurious alerts to the users. Compared to other solutions, this approach solves the difficult problem without constraining the topology of the topic web.

VI. Implementation and Experiments

A prototype event notification system has been developed based on the described R-Event framework. The notification system allows users within a group to publish and subscribe presence information. Users can respond to received presence information to enable real-time collaboration. For example, when an expert becomes available through his presence notification, a manager may respond to the notification and propose a new task force be formed with the expert as the team leader. This response is propagated to the group so that interested members can set up a new workflow using the proposed topic web.

Figure 5:
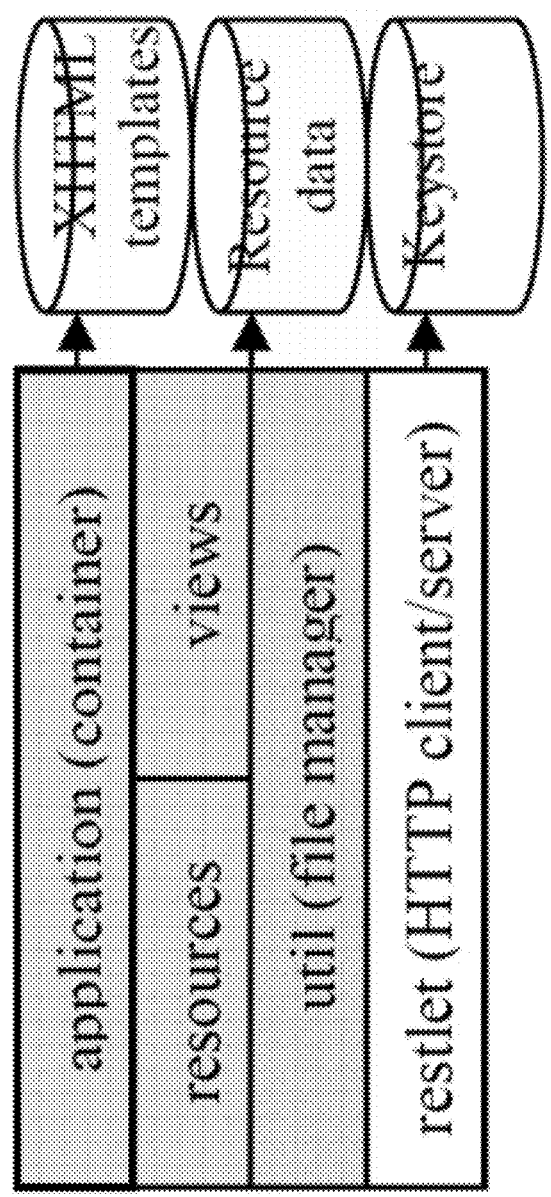
FIG. 5 is a topic hub stack implemented by four Java packages.

The prototype was written in Java using Restlet 1.1.4. The implementation followed the Model-View-Controller (MVC) design pattern. The Model contains the persistent data stored on disk. The Controller contains the resources and the View contains the view objects that generate XHTML pages from the XHTML templates. The topic hub stack was implemented by four Java packages, as illustrated in FIG. 5.

For this prototype, we used an OpenSSL package as the CA to generate certificates for the topic hubs, and Java keytool to manage the keystores for the hubs. Resources states were managed by a file manager that synchronized the access to them. A hub used a separate thread to dispatch notifications from a queue shared by all resources. Because HTML forms only supports POST and GET, we used JavaScript (XMLHttpRequest) to implement the PUT and DELETE operations for pages that update or delete resources.

Users interact with the services using web browsers (e.g., Internet Explorer, Firefox, Safari, Opera, etc.). Temporarily, the notifications were delivered to the browsers using automatic page refreshing. This is a temporary solution as our focus is on communications between hubs, instead of between browser and server. However, the R-Event framework should work with any client side technologies, such as Ajax or Server-Sent Event technologies.

We measured the performance of the prototype system in a LAN environment. The hubs were running on a Windows 2003 Server with 3 GHz dual core and 2 GB RAM. The performances of several key services were measured, where S means subscription, L means listener, and N means notification. The time durations for each method are recorded in the following table. The time duration includes processing the request, saving data to the disk, and assembling the resource representation.

Table 1 shows that adding a listener (POST L) takes the longest time and this is expected because it is a nested operation, where $$t(POST\ L) = \text{processing time} + \text{network latency} + t(PUTS).$$

The time to update a notification (PUT N) is negligible (close to 0 ms), which is desirable because PUT is used to propagate notifications.

| Task | POST S | Post L | Post C | Post N | Put N |
|---|---|---|---|---|---|
| Avg | 14.1 | 38.9 | 6.2 | 9.5 | 0.0 |
| Std Dev. | 13.7 | 16.8 | 8.1 | 0.0 | 0.0 |

The discussion above has presented an approach and a framework in which the elements in EDA can be projected and represented by REST resources, protocols and services. A RESTful web service framework, "R-Event," has been developed and presented based on this projection. The REST resources, protocols, services and securities are defined formally as well as described informally. An embodiment in accordance with the present invention of an event-driven web can be built using this framework. Advantages, including addressability, dynamic topology, robustness and scalability, etc. of this approach over conventional notification systems have been discussed. Preliminary prototype performance tests show that the proposed approach is feasible and advantageous.

Embodiments Using Restful Web Services

We now turn to a discussion of embodiments of the present invention that use RESTful web services to provide bidirectional event subscription and notification.

Embodiments of the present invention provide a bidirectional subscription that includes unidirectional subscription as a special case. A bidirectional subscription represents a bidirectional event flow between a pair of distributed components in a distributed hypermedia system. The creation of a bidirectional subscription is achieved through a set of resources. In particular, embodiments of this invention involve the following components each with predefined functions.

Figure 6:
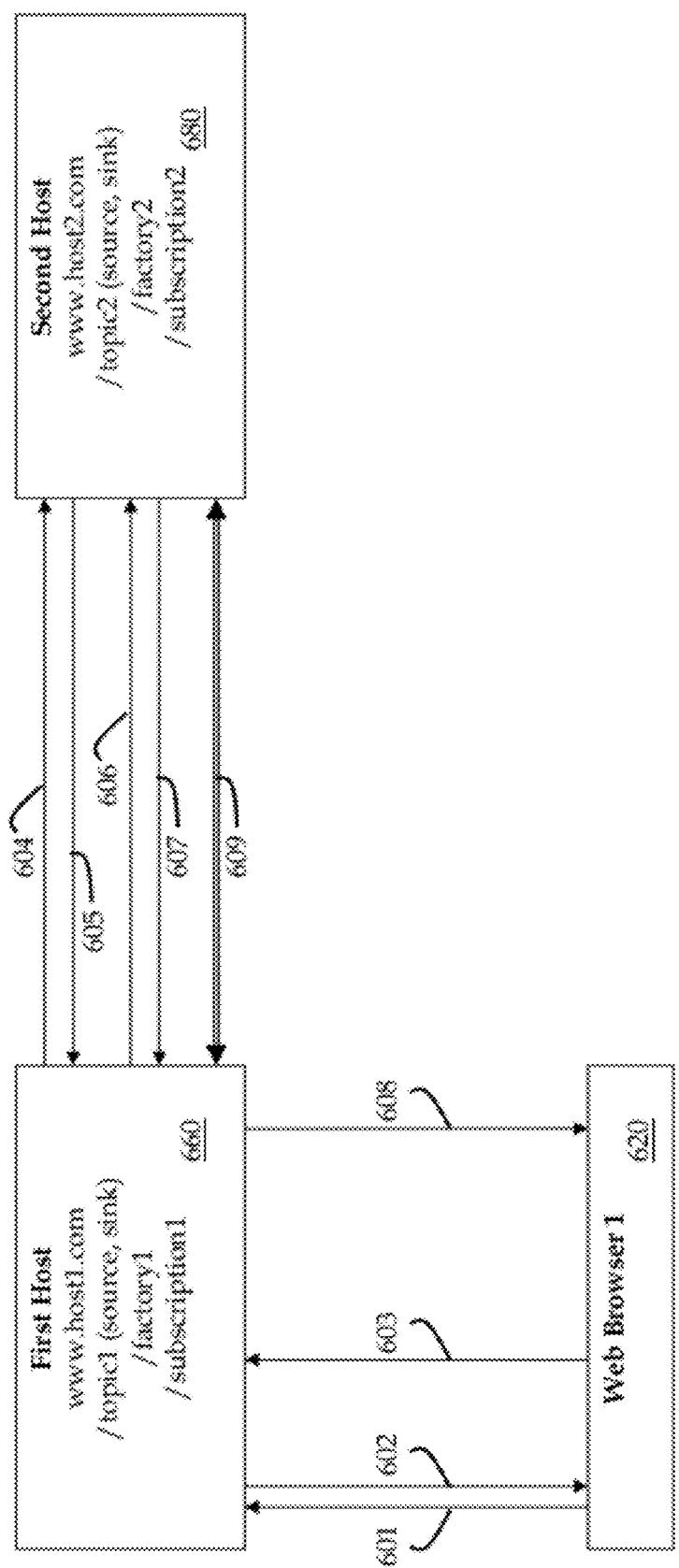
FIG. 6 illustrates the process to create a bidirectional event flow between two topic resources, in accordance with an embodiment of the present invention.

1) Topic: any resource that supports discovery of its subscription factory.
2) Factory: a resource that accepts creation of subscription resources; it may be the same as the topic resource.
3) Subscription: a resource that represents a subscription relation.
4) Source: a Web service that sends notifications and accepts requests to create subscriptions.
5) Sink: a Web service that receives notifications;

FIG. 6 illustrates a simplified block diagram and message transfer of the architecture of the system referenced above. In particular, FIG. 6 illustrates the process to create a bidirectional event flow between two topic resources, where each topic acts as both source and sink.

Figure 7:
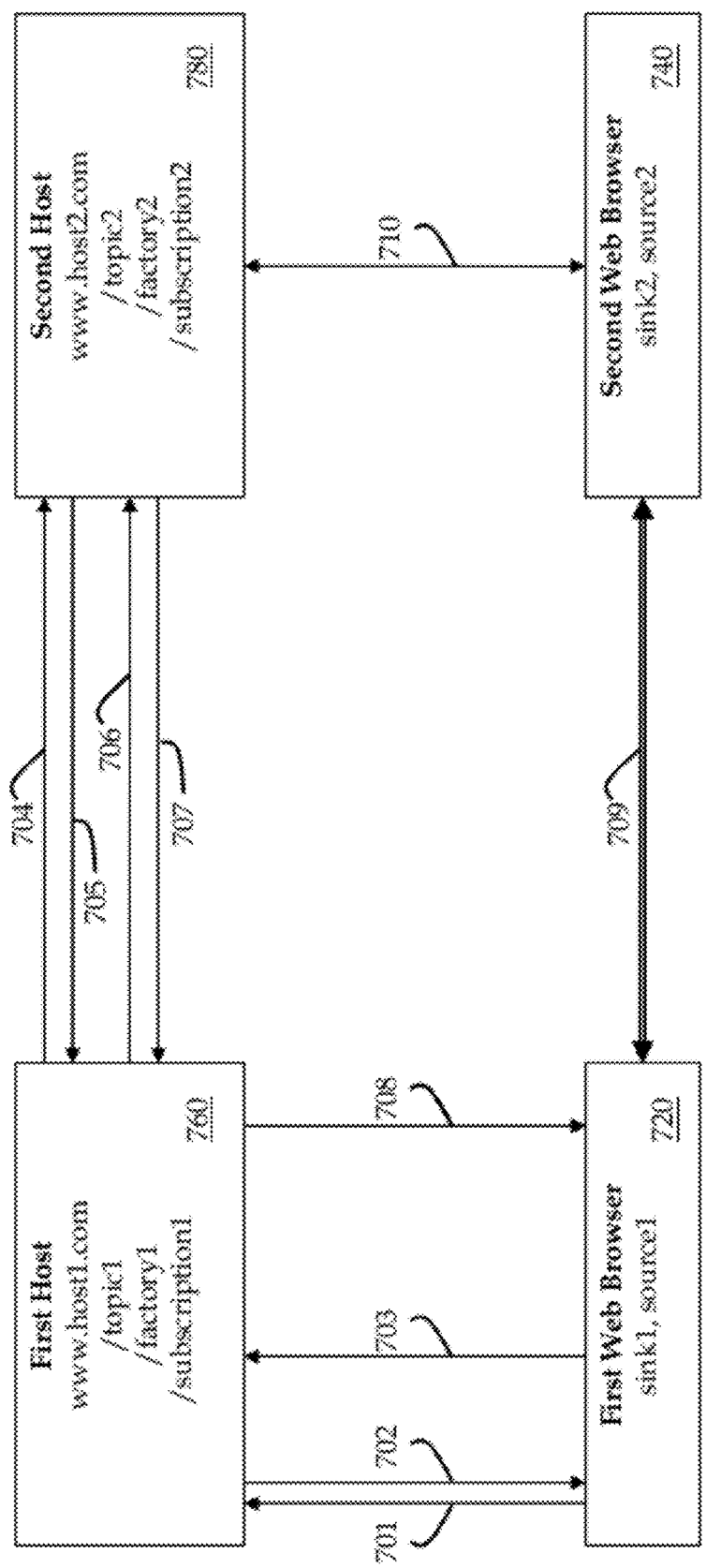
FIG. 7 illustrates a protocol used to create a bidirectional subscription, in accordance with an embodiment of the invention.

FIG. 7 illustrates a protocol used to create a bidirectional subscription, in accordance with an embodiment of the invention. In particular, FIG. 7 illustrates that the same process can create a bidirectional event flow between two Web browsers, in which both sinks and sources reside.

A bidirectional subscription is a logical relation that includes two subscription resources, subscription1 and susbscription2. These two subscription resources are "entangled," such that they interconnect the same pair of hosts, but in opposite directions with the hosts serving as source and sink for one subscription, respectively, and sink and source for the other subscription, respectively. Furthermore, the entangled subscriptions have the same lifecycle such that they are set up and taken down together. Entanglement means that the two subscriptions have the same lifecycle, i.e., they are created in one transaction and deleted in one transaction. One subscription does not exist without the other subscription. In the protocol of FIG. 6, first Web browser 620 needs to know the URIs of the two topics, e.g., http://www.host1.com/topic1 and http://www.host2.com/topic2. The other resources and services are discovered by hypertext embedded within the message transfers. The protocol messages for each step are illustrated below. For clarity and extensibility, we assume the HTTP payloads are XML (application/xml). But the protocol works with any media types that convey the same protocol information.

Step 1: First Web browser 620 discovers the subscription factory of topic1, hosted by first host 660, by use of messages 601 and 602 as described below:

Message 601 is used by First Web browser 620 to send a HTTP HEAD request to first host 660. An embodiment of message 601 is listed below:

```
HEAD /topic1 HTTP 1.1
Host: www.host1.com
```

Message 602 is used by first host 660 to send a hypertext response message, including the factory URI, back to first Web browser 620. An embodiment of message 602 is listed below using Link header defined by RFC5988:

```
200 OK HTTP 1.1
Link: </topic1/factory1>; rel=subscribe
```

Step 2: Create a bidirectional subscription between topic1 and topic2, hosted by first host 660 and second host 680, respectively, by use of messages 603 through 609 as described below:

Message 603 is used by first Web browser 620 to send a HTTP POST request to first host 660 to create a bidirectional subscription. An embodiment of message 603 is listed below:

```
POST /factory1 HTTP 1.1
Host: www.host1.com
Content-Type: application/xml
<subscription>
  <expiry>...</expiry>
  <outbound>
    <source href="http://www.host1.com/topic1" />
    <sink href="http://www.host2.com/topic2" />
    <filter>...</filter>
  </outbound>
  <inbound>
    <source href="http://www.host2.com/topic2" />
    <sink href="http://www.host1.com/topic1" />
    <filter>...</filter>
  </inbound>
```

First host 660 will process the request sent by first Web browser 620 via message 603, and will create a first subscription resource "subscription1" that represents an outbound event flow from topic1 to topic2 in the request.

Message 604 is used by first host 660 to send an HTTP HEAD to second host 680 in order to discover the factory of topic2. Message 605 is used by second host 680 to send the response back to first host 660. This message exchange is similar to that of messages 601 and 602, except as to the topic2.

Message 606 is used by first host 660 to send a POST request to second host 680 in order to create a second subscription, "subscription1." Embedded within message 606 is an instruction to second host 680 that the second subscription is to be entangled with the first subscription resource "subscription1" created by use of message 603. An embodiment of message 606 is listed below:

```
POST /factory2 HTTP 1.1
Host: www.host1.com
Accept: application/xml
<subscription>
```

-continued

```
  <expiry>...</expiry>
  <link rel="entangle" href="http://www.host1.com/subscription1" />
  <outbound>
    <source href="http://www.host2.com/topic2" />
    <sink href="http://www.host1.com/topic1" />
    <filter>...</filter>
  </outbound>
</subscription>
```

Message 607, sent by second host 680 to first host 660, is used by second host 680 to process the request received via message 606 and respond with a URI to the created subscription2. An embodiment of message 607 is listed below:

```
201 Created HTTP 1.1
Location: http://www.host2.com/subscription2
```

Upon receipt of the message 607, first host 660 updates subscription1 to link to the entangled subscription2

Message 608 is used by first host 660 to return a hypertext response to first Web browser 620, which contains a link to subscription1. An embodiment of message 608 in accordance with the present invention is listed below:

```
201 Created HTTP 1.1
Location: http://www.host1.com/subscription1
```

FIG. 7 illustrates another embodiment in accordance with the present invention of a protocol to create a bidirectional subscription. FIG. 7 is similar to FIG. 6, except that FIG. 7 illustrates a bidirectional event flow between two Web browsers, and except that message 603 is replaced by message 703, assuming that the sources and sinks in the Web browsers are XMPP entities. To support this architecture, second Web browser 740 and second host 780 maintain some communication 710, e.g. Server-Sent Events. Communication 710 allows the second browser to receive events from www.host2.com triggered by the protocol messages. An embodiment of message 703 in accordance with the present invention is listed below:

```
POST /factory1 HTTP 1.1
Host: www.host1.com
Content-Type: application/xml
<subscription>
  <expiry>...</expiry>
  <outbound>
    <source href="xmpp:user1@host1.com/source1" />
    <sink href="xmpp:user2@host2.com/sink2" />
    <filter>...</filter>
  </outbound>
  <inbound>
    <source href="xmpp:user2@host2.com/source2" />
    <sink href="xmpp:user1@host1.com/sink1" />
    <filter>...</filter>
  </inbound>
</subscription>
```

To create a unidirectional subscription on topic1, message 703 may be modified to remove the portion from <inbound> through </inbound>. An embodiment of message 703 so modified is listed below:

```
POST /factory1 HTTP 1.1
Host: www.host1.com
Content-Type: application/xml
<subscription>
  <expiry>...</expiry>
  <outbound>
    <source href="..." />
    <sink href="..." />
    <filter>...</filter>
  </outbound>
</subscription>
```

The content and usage of messages 701, 702, 704, 705, 706 and 707 are similar to that of messages 601, 602, 604, 605, 606 and 607, respectively. Message 709 represents bidirectional event streams between the two browsers. They could be text messages over TCP/IP or audio video streams over RTP B) Cache Messages 601, 602, 604 and 605 in the protocol of FIG. 6 use HTTP GET to discover subscription factories. The HTTP protocol permits the responses to be cached in order to reduce network latency. When cached factories are used, the four discovery messages 601, 602, 604 and 605 are unnecessary, thereby simplifying the total number of messages in the protocol to be four, namely messages 603, 606, 607 and 608.

C) Synchronization Protocol

Figure 8:
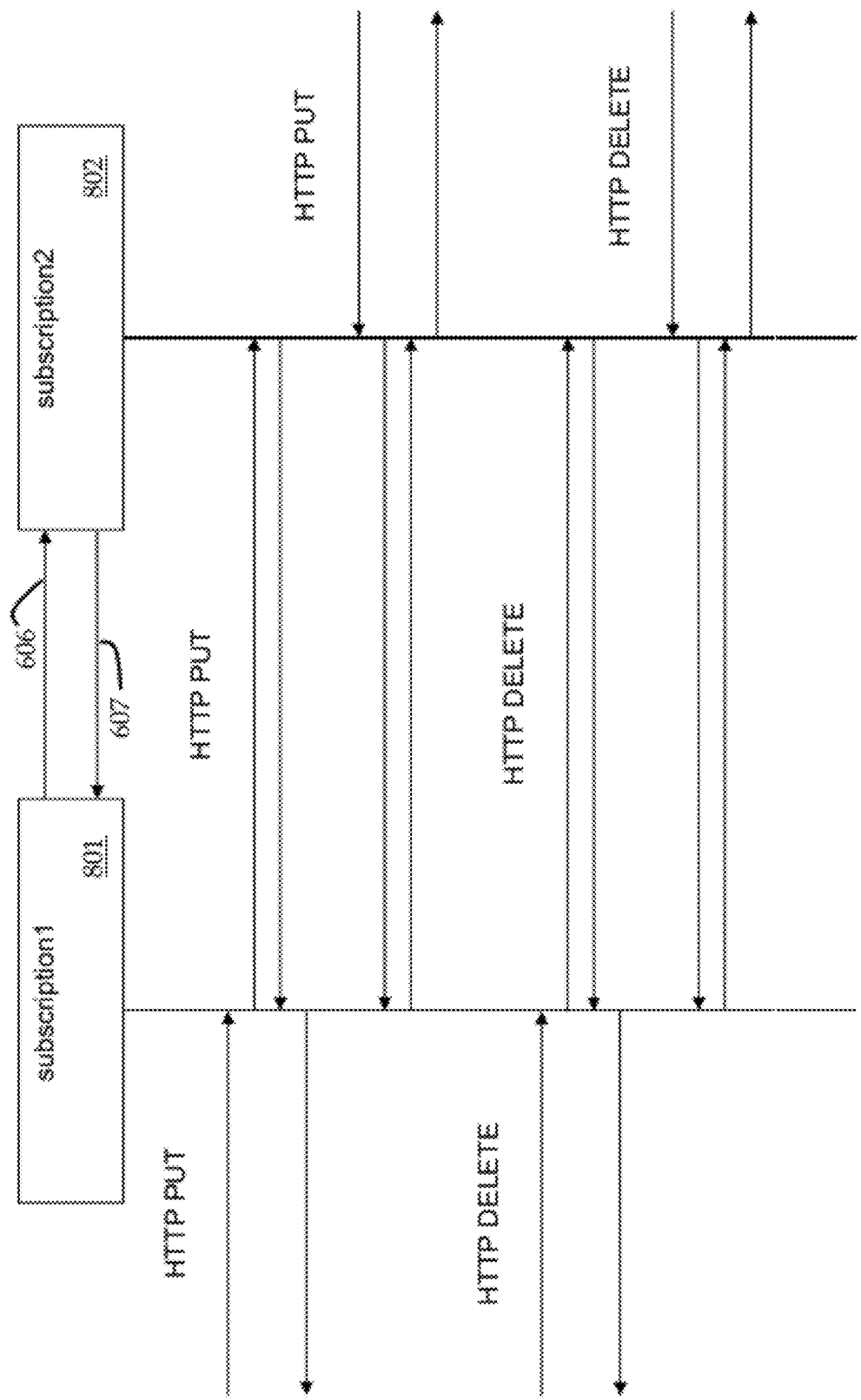
FIG. 8 illustrates a configuration in which subscription1 and subscription2 are linked to each.

FIG. 8 illustrates a configuration in which subscription) 801 and subscription2 802 are linked to each other by messages 606 and 607. Both subscription1 801 and subscription2 802 are resources that can be referenced by URI and accessed through HTTP. The representation of these resources can be retrieved with HTTP GET. Either of these resources can be updated or deleted. Typically, a user agent such as a web browser would initiate the requests as instructed by a user, for instance if a user terminates a conversation. Because subscription1 and subscription2 are linked to each other (i.e., entangled), changes to one of them can be synchronized with changes to the other, by one subscription updating and/or deleting the other subscription. Both nested modification and deletion are idempotent operations in this case.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the present invention to the precise form disclosed. Modifications and variations are possible in light of the above teachings or may be acquired from practice of the present invention.

No element, act, or instruction used in the description of the present application should be construed as critical or essential to the invention unless explicitly described as such. Also, as used herein, the article "a" is intended to include one or more items. Where only one item is intended, the term one or similar language is used. Further, the terms any of followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶ 6, and any claim without the word "means" is not so intended.

What is claimed is:

1. A method to create a bi-directional event subscription, comprising:
   receiving a discovery request from a web browser for a URI of a subscription factory of a first topic;
   providing a URI of the subscription factory of the first topic;
   receiving a request from the web browser to create a bidirectional subscription;
   creating a first subscription resource to represent an outbound event flow from a first topic to a second topic;
   sending a discovery request to a remote host for a URI of a subscription factory of the second topic;
   receiving from the remote host the URI of the subscription factory of the second topic;
   requesting that the remote host create a second subscription resource, to represent an inbound event flow from the second topic to the first topic, wherein the request further comprises a request to entangle the second subscription with the first subscription;
   receiving from the remote host a URI of the second subscription resource;
   entangling the first subscription with the second subscription to form the bi-directional event subscription, wherein entangled subscriptions are created in one transaction and deleted in one transaction, such that one subscription of the entangled subscriptions does not exist without the other subscription of the entangled subscriptions; and
   providing to the web browser a URI of the first subscription.

2. The method of claim 1, wherein the method is performed by a topic hub that provides RESTful web services.

3. The method of claim 1, wherein the remote host comprises a topic hub that provides RESTful web services.

4. The method of claim 3, wherein the remote host comprises a member of a topic web.

5. The method of claim 1, further comprising filtering the bi-directional event subscription.

6. The method of claim 1, further comprising providing the URI of the first subscription to an alternative listener.

7. The method of claim 1, wherein the bi-directional event subscription further comprises a status indicator.

8. The method of claim 1, wherein the web browser comprises an XMPP entity.

9. The method of claim 1, wherein the remote host communicates with a remote web browser, the remote web browser comprising an XMPP entity.

10. The method of claim 1, wherein the URI of the subscription factory of the first topic is provided from a cache.

11. A system to create bi-directional event subscriptions, comprising:
   a first receiver configured to receive a discovery request from a web browser for a URI of a subscription factory of a first topic, and to receive a request from the web browser to create a bidirectional subscription;
   a first transmitter configured to provide a URI of the subscription factory of the first topic;
   a creation module configured to create a first subscription resource to represent an outbound event flow from a first topic to a second topic;
   a second transmitter configured to send a discovery request to a remote host for a URI of a subscription factory of the second topic, and to send a request to the remote host that the remote host create a second subscription resource, to represent an inbound event flow from the second topic to the first topic, wherein the request further comprises a request to entangle the second subscription with the first subscription;
   a second receiver configured to receive from the remote host the URI of the subscription factory of the second topic, and to receive from the remote host a URI of the second subscription resource;
   an entanglement module configured to entangle the first subscription with the second subscription to form the bi-directional event subscription, wherein entangled subscriptions are created in one transaction and deleted in one transaction, such that one subscription of the entangled subscriptions does not exist without the other subscription of the entangled subscriptions,
   wherein the first transmitter is further configured to provide to the web browser a URI of the first subscription.

12. The system of claim 11, further comprising a topic hub that provides RESTful web services.

13. The system of claim 11, wherein the remote host comprises a topic hub that provides RESTful web services.

14. The system of claim 13, wherein the remote host comprises a member of a topic web.

15. The system of claim 11, further comprising a filter configured to filter the bi-directional event subscription.

16. The system of claim 11, further comprising a transmitter configured to provide the URI of the first subscription to an alternative listener.

17. The system of claim 11, wherein the bi-directional event subscription further comprises a status indicator.

18. The system of claim 11, wherein the first transmitter and the first receiver are further configured to communicate with an XMPP entity.

19. The system of claim 11, wherein the remote host communicates with a remote web browser, the remote web browser comprising an XMPP entity.

20. The system of claim 11, further comprising a cache configured to provide the URI of the subscription factory of the first topic.

* * * * *